(No Model.) 2 Sheets—Sheet 1.
L. C. LABADY.
HUB FOR VEHICLE WHEELS.

No. 493,097. Patented Mar. 7, 1893.

Witnesses:
Harry S. Rohrer.
Wm. E. Knight.

Inventor
Louis C. Labady.
By Knight Bros
Attorneys.

(No Model.) 2 Sheets—Sheet 2.

L. C. LABADY.
HUB FOR VEHICLE WHEELS.

No. 493,097. Patented Mar. 7, 1893.

Witnesses:
Harry S. Rohrer
Wm. E. Knight

Inventor:
Louis C. Labady.
By Knight Bros
Attorneys.

UNITED STATES PATENT OFFICE.

LOUIS C. LABADY, OF TACOMA, WASHINGTON.

HUB FOR VEHICLE-WHEELS.

SPECIFICATION forming part of Letters Patent No. 493,097, dated March 7, 1893.

Application filed April 23, 1892. Serial No. 430,345. (No model.)

*To all whom it may concern:*

Be it known that I, LOUIS C. LABADY, a citizen of the United States, residing at Tacoma, in the county of Pierce and State of Washington, have invented certain new and useful Improvements in Hubs for Vehicle-Wheels; and the following specification, taken in connection with the accompanying drawings, is a full, clear, and exact description of my improvements, such as will enable those skilled in the art to make and use the same.

My invention relates to improved means of reducing the friction and more perfectly lubricating a hub of vehicle wheels, and consists of features of novelty which will first be described with reference to the accompanying drawings and then more particularly pointed out in the claims.

Figure 1:
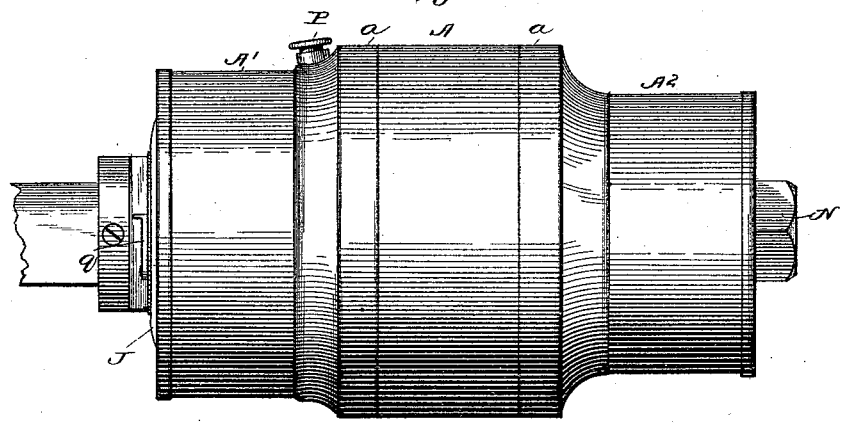
Figure 2:
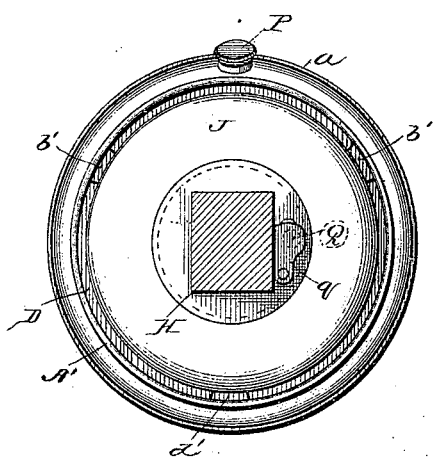
Figure 3:
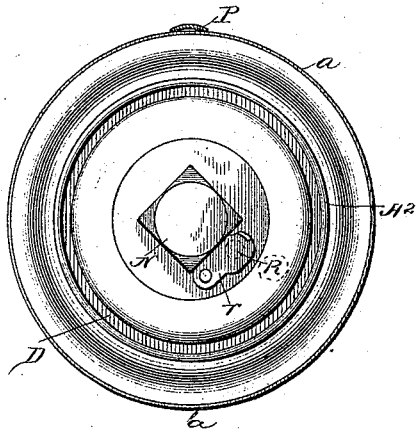
Figure 4:
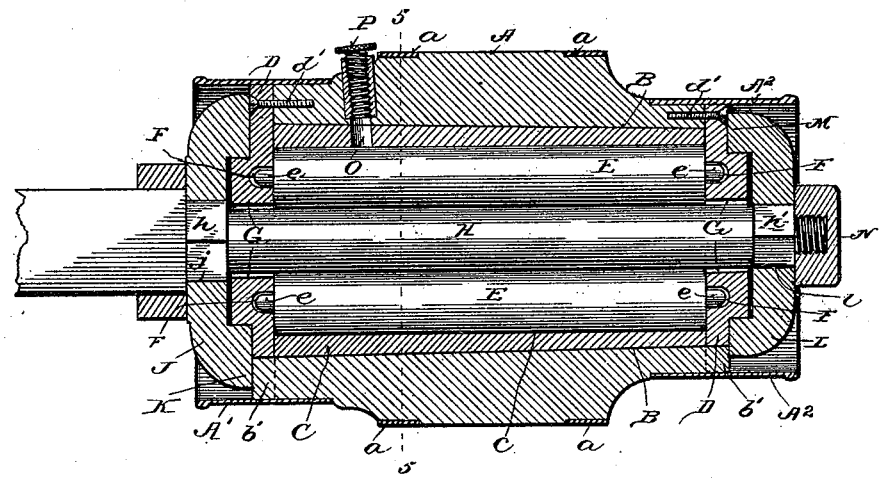
Figure 5:
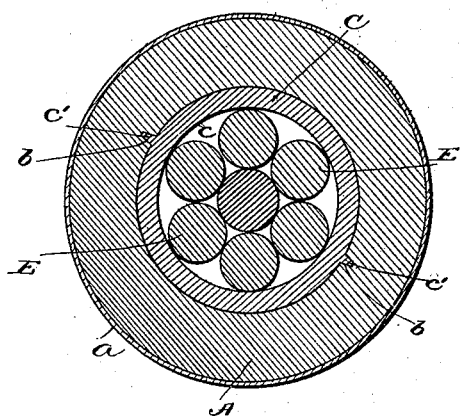
Figure 6:
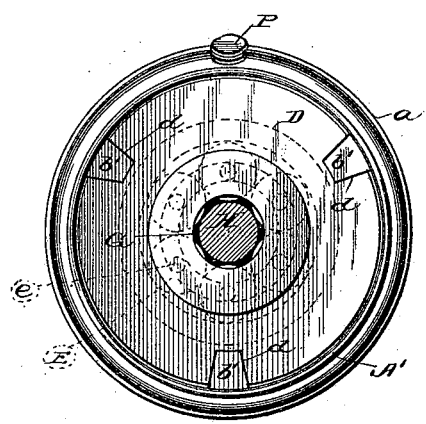

In said drawings:—Figure 1 is a side elevation of my improved hub and a section of an axle inserted therein. Fig. 2 is a rear end view thereof. Fig. 3 is a front end view thereof. Fig. 4 is a longitudinal sectional view. Fig. 5 is a transverse sectional view taken on the line 5—5 of Fig. 4. Fig. 6 is a rear end view with the dust cap and axle removed.

A is my improved hub provided with the customary strengthening bands $a$ and the hub bands $A'$, $A^2$. It is formed with a central tapering bore B formed with longitudinal grooves $b$.

C is a hollow friction cylinder or thimble formed with a cylindrical central bore $c$, and a tapering outer surface provided with the longitudinal splines $c'$ which are adapted to fit in the grooves $b$ of the hub. Said spindle is formed of proper size to fit the bore B of the hub.

D are circular bearing blocks formed with radial notches $d$ on their peripheries which are adapted to engage lugs $b'$ of substantially the same form on the inner and outer ends of the hub.

E are a series of friction rollers formed with the journal ends $e$ projecting from their ends which engage and operate in circular grooves F formed in the inner face of the bearing blocks D whereby they are held in position, but allowed sufficient play for easy operation. The bearing blocks are secured in place to the ends of the hubs by means of screws $d'$ which pass through suitable perforations in said heads into the hub.

G is a circular opening in the center of each of the bearing blocks D for the passage of the axle H.

J is a circular dust cap or block formed with a central square perforation $j$ which engages a squared portion $h$ of the axle H, so that it will be held stationary with the axle. The cap J is adapted to fit in the inner dust band $A'$ of the hub A against the bearing block D and K is an adjustable collar also squared on the axle H and bearing against the cap J and adapted to be moved on the axle to compensate for the wear on the face of the cap. It is held from movement by the set screw $k$, and is provided with a groove $k'$ to make room for the hinged cap $q$.

L is a smaller cap similar to the cap J formed with a central square opening $l$ which fits over the square end $h'$ of the axle H; said cap L being adapted to fit in the outer hub band $A^2$ against the outer bearing block D.

N is a nut engaging the screw-threaded end of the axle for holding hub and the several parts in position.

It will be observed that the axle H passes through the hub and bears against all of the friction rollers E and takes up part of the friction therefrom, said rollers in turn bearing against the friction thimble C which relieves them of the rest of the friction. As the outer cap L is squared to the axle and does not turn, the retaining nut N can be screwed up tight against it and there is no danger of its being loosened by the revolving wheel and lost off. The friction caps and thimble can be replaced at small cost when worn out.

I propose to make the several parts of iron or steel as is customary with such devices.

O is an oil passage passing through the hub A and thimble C for lubricating. It is provided with an internally screw-threaded bushing at its outer end into which screws a cap P.

Q and R are oil passages formed respectively in the caps J and L and provided with pivoted covering plates $q$ and $r$.

By the above means a very economical and convenient hub can be produced which has proven very satisfactory.

Having thus fully described my invention, the following is what I claim as new therein and desire to secure by Letters Patent:

1. A hub for vehicle wheels formed with a central bore therethrough, a friction thimble secured in the bore of the hub and formed with a bore of circular cross-section, bearing blocks formed with bearing grooves in their inner faces and secured to the ends of said hub, friction rollers supported in the bore of said friction thimble and having their journal ends journaled in the grooves in the inner faces of the bearing blocks, and suitable caps supported on the axle which passes through said hub, substantially as set forth.

2. In combination with a hub for vehicle wheels, the bearing blocks secured to the ends of the hub, the friction rollers journaled in said bearing blocks inside of the hub, an axle passing through the hub and bearing against said friction rollers, caps squared on said axle, washers between said caps and bearing blocks, and a retaining nut screwed onto the outer end of the axle against the outer cap, substantially as set forth.

3. In combination with a hub for vehicle wheels, the radial lugs formed on the ends of the hub, the bearing blocks provided with bearing grooves in their inner faces and formed with radial recesses in their peripheries which engage over the radial lugs on the hubs, screws for securing said heads to the ends of the hubs, friction rollers supported in the hubs and having journal ends bearing in the grooves in the inner faces of the bearing blocks, an axle passing through said hub and bearing against the friction rollers, and suitable caps carried by the axle, and a retaining nut, substantially as set forth.

4. In combination with a hub, a friction thimble secured in said hub, heads secured to the ends of the hub, friction rollers journaled in said heads, an axle passing through said hub, caps carried by said axle, an oil passage through the hub and friction thimble, and oil passages through the caps, substantially as set forth.

LOUIS C. LABADY.

Witnesses:
C. H. CORY,
A. A. KNIGHT.